United States Patent [19]
Taylor

[11] Patent Number: 5,832,497
[45] Date of Patent: Nov. 3, 1998

[54] ELECTRONIC AUTOMATED INFORMATION EXCHANGE AND MANAGEMENT SYSTEM

[75] Inventor: Jeffrey C. Taylor, Holliston, Mass.

[73] Assignee: TMP Worldwide Inc., New York, N.Y.

[21] Appl. No.: 513,248

[22] Filed: Aug. 10, 1995

[51] Int. Cl.⁶ .................................................. G06F 17/30
[52] U.S. Cl. .................................. 707/104; 707/10; 707/3
[58] Field of Search .................................. 395/600, 610, 395/613, 615; 707/10, 104, 3

[56] References Cited

U.S. PATENT DOCUMENTS

| | | | |
|---|---|---|---|
| 5,164,897 | 11/1992 | Clark et al. | 364/401 |
| 5,197,004 | 3/1993 | Sobotka et al. | 364/419 |
| 5,301,105 | 4/1994 | Cummings, Jr. | 364/401 |
| 5,416,694 | 5/1995 | Parrish et al. | 364/401 |
| 5,426,780 | 6/1995 | Gerull et al. | 395/600 |
| 5,506,984 | 4/1996 | Miller | 707/104 |
| 5,592,375 | 1/1997 | Salmon et al. | 395/207 |

OTHER PUBLICATIONS

Clyde et al, An object Oriented Implementation of an Adaptive Classification of Job Openings, IEEE, pp. 9–16, Feb. 1995.
Belanger et al, Employment Interview Information Available Online vol. 10 No. 1, Online Reviews, pp. 45–56, Feb. 1996.
Dolan et al, Top US Sources for an Online Job, Database, pp. 35–43, Nov. 1994.
Bristina B. et al, Vendors to Push Multimedia Wares at CD Roms Show, PC Week, p. 28, Oct. 1991.
Martin, The USA at your Fingertips, p. 89, Jun. 1993.
Chabrow, Online Employment, pp. 38–40, Jan. 1995.
APS Related Information, pp. 3–2, 3–3, 4–3, 4–4, 4–12, 4–26, 4–31, 4–32, 4–36.
Harry, Resume: Resumix Announces Internet Services, Work–Group Computing, pp. 1–3, Jun. 1995.
Kolbasuk, Help Wanted? Find it Online, InformationWeek, pp. 1–2, Jun. 1995.
Riley, Resume Databases on the Internet, The Riley Guide, pp. 1–5, 1995.
MCI Communicarions Corporation, "MCI, Job and resumes posting related information".
Sullivan, Kristina B. Vendors to Push Multimedia Wares at CD ROMs Show (PC Week) oct. 1991 p. (28).

*Primary Examiner*—Thomas G. Black
*Assistant Examiner*—Frantz Coby
*Attorney, Agent, or Firm*—Fulbright & Jaworski LLP

[57] ABSTRACT

A computer implemented system is provided in order to manage the exchange of information through two databases. The system is particularly useful for an employment recruitment environment or other environments which require an exchange between individuals in two or more categories such as job applicants and employers. According to the preferred configuration, the system manages a database of job postings. Each posting is stored in a job record, and the system is capable of searching on a plurality of keys in the job record to identify a job record suitable to a particular applicant. The system then facilitates creation of a resume record and designation of the resume record for an accessible resume base or a selected job record. Finally, the system permits query of a resume base in order to identify recruitment candidates for job positions.

10 Claims, 1 Drawing Sheet

ELECTRONIC AUTOMATED INFORMATION EXCHANGE AND MANAGEMENT SYSTEM

BACKGROUND OF THE INVENTION

1. Field of the Invention

The invention relates to a computer implemented system for advertising and accepting submissions in response to such advertisements. More particularly, the invention relates to a system for posting job advertisements which includes a search mechanism and which allows applicants to submit, via on-line access, resumes and apply for the jobs. The system may advantageously be accessible within a network, such as a local area network, a wide area network, or the Internet, in order to permit on-line access to a jobs database through a search engine; and to manage the application for such jobs and submission of resumes, application letters and other relevant information.

2. Description of the Related Technology

The Internet is a worldwide system of connected computer networks. The Internet enables computers of all kinds to share services and to communicate directly, as if they were part of one giant seamless global computing machine. The Internet is currently configured to join together large commercial communications services as well as thousands of university, government and corporate computer networks and other computers. Communications over the Internet is accomplished by defined communication protocols. The World Wide Web is a subset of the Internet which uses a file transfer program ("FTP") protocol to permit communication between sites. Such communication may be interactive and is referred to as on-line.

There are currently on-line classified advertisement systems which are accessible through the World Wide Web. For example, the San Jose Mercury News places classified advertisements in electronic format on a computer system accessible over the World Wide Web. There have been numerous bulletin board web sites which post job information. These web sites generally post a description of a position and request a response either via an electronic mail address or a postal address. Heretofore, there has not been available a comprehensive system for managing classified advertisements with an effective search engine; a secured resume management facility; accessible resume database; and a targeted resume submission system.

SUMMARY OF THE INVENTION

It is an object of invention to provide a computer implemented system for posting and searching through job advertisements. It is a further object of the invention to provide an on-line resume management system. It is a further object of the invention to provide an on-line resume submission system. It is a further object of the invention to provide a computer implemented system to assist in human resources functions. It is a further object of the invention to provide a computer implemented system which links background information, in electronically readable memory, concerning advertisers to an electronic advertisement also stored in memory. It is a further object of the invention to provide an iterative job search engine. It is a further object of the invention to provide an on-line system for collecting resume information and job application information. It is a further object of the invention to provide an on-line job and resume search engine.

The invention may be implemented in a computer system whose actions are directed by a computer program configured as a multiple database information exchange management system. The system includes a first database stored in electronically readable memory (resume base) and a second database store in electronically readable memory (job base). The system also includes a communication port suitable for transmitting and receiving data and instructions in the form of electrical signals, to and from remote computers and a database manager for creating and revising records of the first and second databases. The system may also include an iterative database query engine connected to the memory and a process controller connected to the database manager, the iterative data base query engine and the communication port. An accounting system may also be provided. The job base records may contain a plurality of search key fields. The iterative database query engine may include means for searching on a plurality of search key fields of a database for satisfaction of one or more conditions and means for reporting all variables in said search key fields of records which satisfy the search conditions. The search key fields may restrict the possible entries to a predetermined set of entries. The system may also include means for relating a record of the first database to a record of the second database by storing job record identification in a relation field of a resume record. Alternatively, the relation may be accomplished by storing a resume record identification in a relation field of a job record or creating an entry in a relation table, stored in electronically readable memory, wherein the relation entry includes identification of a resume record and a job record.

Traditional media such as newspaper and trade journal advertisements do not supply the tools necessary for recruiting qualified candidates in the increasingly competitive environment driven by the technological advances of the last two decades. The Internet provides a new media that is accessible by individuals in a manner which permits rapid response and easy interaction. A system according to the invention will operate to lead a candidate through certain steps and parameters to a qualified job search by location, company, discipline, industry, and job titles. According to the invention, jobs may be identified by a string of parameters which may be used to effectively allow iterative searching and identification of suitable jobs even in extremely large job databases. According to the invention, the job base includes parameters which permit a search engine to select parameter choices. Establishing certain parameters such as job discipline or job location permits narrowing an extremely large database to a more manageable size. Once a job opening is selected, a searcher may submit an on-line application by submitting a prestored resume, revising a prestored resume, or creating a new resume on-line.

DETAILED DESCRIPTION OF THE PREFERRED EMBODIMENT

Figure 1:
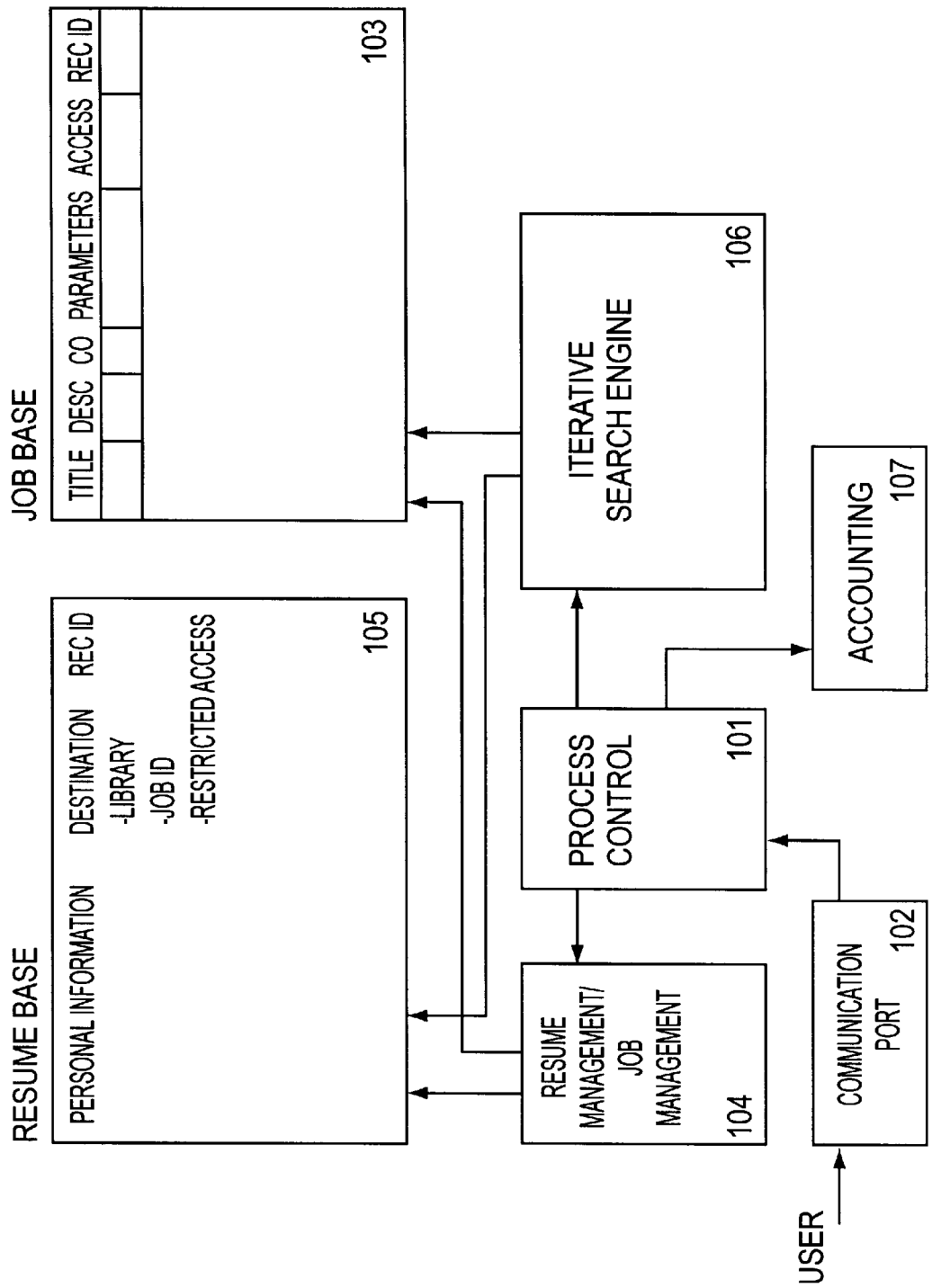
FIG. 1 shows a schematic of the system.

FIG. 1 shows a schematic of the system according to the invention. It is to be understood that the system can be implemented using general purpose computer hardware as a network site. The general purpose hardware may advantageously be in the form of a Unix workstation or other suitable computer. The hardware will be configured and customized by various software modules. The software modules will include communications software of the type conventionally used for Internet communications and a database management system. Any number of commercially available database management systems may be utilized to implement the invention. Those of ordinary skill in the art of database management application programming will be able to make and use the invention according to the disclosure hereof.

According to the invention, a process control unit 101 will manage the flow of information through the system. A communication part 102 is provided to allow access to the system through communications with other computers connected to the network. According to the preferred embodiment, the network may include access over the Internet to any number of external computer systems or access through local or wide area network to other connected computers either directly or through modems. The system will include database memory 103 provided to store the job base. The job base may be in the form of a data file comprised of a plurality of records, each record corresponding to a posted job. Each record will include a number of predefined fields containing search parameters and additional fields containing descriptive information of the type generally used in job advertisements. According to the preferred embodiment, the search parameters may include fields, such as: specified job location (preferably by region or state); job industry; a company identifier; job disciplines; and job titles. An example of industries may include the following:

| | |
|---|---|
| Accounting | Legal |
| Advertising PR | Manufacturing |
| Architecture | Marketing |
| Biotech | Multimedia |
| Civil Service | Non Profit |
| Design | Other |
| Education | Publishing |
| Environmental | Real Estate |
| Financial Banking | Retail |
| Health Care Medical | Telecommunication |
| High-Tech | Transportation |
| Hotel Restaurant | Travel Entertainment |
| Human Services | Utilities |
| Insurance | |

The job disciplines can be established so that each job can be cross-referenced to and identified by one or more disciplines with a reasonable degree of specificity. An example of job disciplines for the biotechnology and pharmaceutical fields may include: chemistry; clinical research; environmental science; management; manufacturing; quality; regulatory affairs; research associates; research scientists; and systems networks. Each application parameter field may be organized by geographical location with any desired amount of specificity. For a nationwide job indexing system, it may be convenient to specify location by region or state. For local applications, it may be more appropriate to specify location by county, city/town or neighborhood.

If a relational database management system is utilized, it would be advantageous to relate the company field of the job base to a company database file which will include relevant information, statistics and descriptions of companies posting jobs.

Finally, the job base records will include some security or password fields which will specify who may have access to the job records for the purpose of posting, revising, maintaining, and deleting job records.

The system may also include memory which stores a resume base 105. The resume base will be a database file which will be formulated by applicant-users for submission to a resume pool accessible to subscribing employer-users or submission to specified employers as a job application. The system also includes a resume management/job management module 104 which manages the creation, revision, and maintenance of resume records contained in the resume base and job records contained in the job base. The system will also include an iterative search engine 106 which handles queries to the resume base and job base. The operational features of the iterative search engine are described below. The resume management/job management module 104 and the iterative search engine 106 may be implemented through commercially available database management systems. Other conventional search and query capabilities may also be used to search the databases.

A user establishing access to the system according to the invention though the communication port will be presented with a variety of menus. According to the preferred embodiment, communication may be effected through hyper text markup language ("html") pages.

It is contemplated that users accessing the system by computer communications will be either "employers" or "applicants." Any user who is not an employer-user will be treated as an applicant-user. Employer-users are those users who are authorized to post jobs to the job base or retrieve contact information from the resume pool.

An authorized employer-user may select a job base maintenance option at the main menu. Employer-users may be granted "write access" to the job base through some identification or verification protocol. A password system or source terminal identification number may be utilized to verify authority for "write access."

Once an authorized employer-user elects to access job posting maintenance, he may have an option of inputting a new posting by creating a new job record in the job base, accessing a current posting (job record), or retrieving applications (resume records). When creating a new job record, an employer-user may be presented with a form to be filled out on-line, or the employer-user may upload a prepared job record to the job base. When creating a new job record on-line, an employer-user may respond to prompts to fill the job record fields. The employer-user may enter narrative for a job description and information for the search parameters. Any search parameter field which has a restriction on available entries may be presented in the form of a menu. If the number of available entries exceeds a predetermined amount, the entries may be presented in a scroll bar window. The entries may be selected by the user, for example, by using a mouse pointer to click on appropriate entries. For example, the discipline field will be limited to certain predetermined disciplines. The employer-user posting a job may be required to select a discipline only from a predetermined list appearing in a menu.

When an authorized employer-user elects to access current job postings, a query may be utilized in order to locate an individual or group of job records. The system will verify that the user has "write access" or authority to modify the job records. The job records may be presented as a form displayed to the user and the user may modify the fields as deemed appropriate. Alternatively, an employer-user may elect to delete any job record, provided he has appropriate authority.

An authorized user may also be presented with an option of retrieving applications (resume records) for the jobs it has posted on the system, i.e., corresponding to its job records. By selecting the option to retrieve applications (resume records), the process control module 101 will instruct the resume management/job management module 104 to retrieve all resume records which designate specified job records from the resume base 105. The mechanism for creating a resume record designated as an application for a particular job will be described below.

As an alternative to requiring on-line access to resume records tagged as applications for jobs, the system may be configured to periodically query the resume base for resume records which are related to job records and, therefore, constitute applications for specific job postings. The resume records thus returned may be sent by E-mail, facsimile or otherwise to the appropriate employer-user. Alternatively, the system may be configured to forward the resume record any time an applicant-user applying for a predetermined job is placed in the resume base.

As discussed above, when accessing the system a user is presented with an options menu. The options menu will also include the option of submitting a resume to the resume base (creating or modifying a resume record), searching the job base, or searching the resume base in addition to the option of creating or modifying a job record (maintaining the job base). As with the option of maintaining the job base, the option of searching the resume base may be restricted to authorized users who subscribe to that portion of the service. When a user selects the option of creating a resume or creating a job posting, the process control unit 101 submits commands to the resume management/job management module 104 which, in turn, passes information for the fields of the specified base from the user's computer through the communication port into the selected database record. The resume base 105 is an electronically stored database. The resume base is a collection of resume records stored in electronically readable memory. The resume records will advantageously include fields specifying name, address, telephone number, E-mail address and narrative fields containing descriptive information in the form of a cover letter, a description of key skills, and identification of a predetermined number of current and previous positions, a specification of term of employment at current and previous positions, and a description of educational background. The fields in a resume record may be populated through use of a form presented to the user. The resume record may also include fields for a user password and a field that is used to designate the record as a submission to an accessible resume pool or a specified job. If the field designates a specified job, it may include a job record identification. The user-applicant will be presented the option of maintaining the resume on the system without submission; submission of the resume to a resume pool accessible to subscribing employers; or submission of the resume as an application to any posted job listing. In the event the resume is submitted to an accessible pool, a mechanism may be provided to prevent access to the resume by specified parties in order to protect an applicant-user from having a current employer, who is also an employer-user, learn that the applicant-user is seeking a new position. Access may be restricted by including a field in the resume record identifying companies which will not be granted access to the resume record even though they may have access to the resume pool or by a fuzzy logic inquiry into the current employer field when any subscribing employer queries the resume pool. A resume record may be "submitted" as a job application by relating the resume record to a job record by placing a job record identification into an appropriate field in the resume record.

It is to be understood that the system is not limited to using the physical file, record and field structures described herein and other physical structures which are logically equivalent will be equivalent for the purpose of this invention.

The iterative search engine 106 will be invoked when an applicant-user selects the job search option from the opening menu or when an employer-user selects the resume search option to search the resume pool. When the iterative search engine is invoked to search the job base, a number of scroll bar type menus may be presented to a user. The scroll bar menus can correspond to the various search parameters and fields of a job record. The menu presents predetermined options corresponding to the available entries for the various fields. The user then selects query entries from the options presented. According to an advantageous feature, fields which are not limited to predetermined entries may be queried using a key word or literal string inquiry. The query will return an indication of the number of records which satisfy the query. If a plurality of records are identified, additional iterations of the search may be executed. Each of the scroll bar menus are represented. However, on re-presentment, rather than displaying the entire universe of available entries for each field only the entries which correspond to entries of records selected in the previous iteration are displayed. The user can then further narrow the selections and submit additional iterative inquiries. When the query narrows selected records to the satisfaction of the user, the user may request display of predetermined portions of the selected record(s). The user is then presented with the option of submitting a previously established resume record as an application; modifying a previously established resume record as an application; or formulating a new resume record as an application. The resume record may advantageously be designated as an application for a selected job by marking a job field with a job identification number corresponding to a record in the job base. As discussed above, the resume record so designated may be transmitted or made available to the job advertiser.

If an employer-user selects the resume pool option, the system may invoke the iterative search engine to query resume records designated for the resume pool. The resume pool may be a subset of records in the resume base. They may be so designated by the presence of special characters in a job-identification field. The system may impose a restriction on records which are returned to an employer-user to ensure that any resume created by an applicant-user who is an employee of the employer-user will not be made available to that employer-user. According to the preferred embodiment, the information returned to the employer-user during a resume pool query will not include contact information. The system may invoke an accounting subsystem 107 when an employer-user requests contact information. According to this feature, employer-users may be charged for access to contact information on applicant-users. The charge may be imposed as a basic subscription charge which will entitle an employer-user to a predetermined number of resume pool applicant-user contact identifications. A predetermined charge may be imposed for each request above and beyond the basic subscription level. Various other schemes may be utilized to charge employer-users or restrict access to contact information fields.

A system according to the invention has been made accessible through the World Wide Web with a URL of http://WWW.monster.com/home.html.

The system has been described with reference to a preferred embodiment particularly suited for advertising jobs; managing the submission of applications for the jobs; and managing a resume and job database. It is to be understood that the system according to the invention is suitable for other applications including the management of other types of advertisements such as for merchandise, housing, or any open request for response. Other open requests for response may include advertisement for the sale of fungible and nonfungible commodities, services or grants which require an interested party to submit information. The submitted information may be in the form of transaction information such as in the case of an advertisement for merchandise, identification of purchaser, identification of where the merchandise is to be shipped, and transaction information such as digital signatures, credit card information and the like. In the case of a system to manage the application for grants, the system may manage grant applications rather than resumes as described in accordance with the preferred embodiment.

While the invention has been described and shown in connection with the preferred embodiment, it is to be understood that modifications may be made without departing from the spirit thereof. The embodiment described is by way of example and should not be construed as limiting of the claims except where referenced to the specification is required for such construction. The claims below is set forth to define the scope of protection sought by this application.

I claim:

1. A computer system whose actions are directed by a computer program configured as a multiple database information exchange management system configured for network operations, comprising:

a first database of personal information stored in electronically readable memory;

a second database of position information stored in electronically readable memory;

a communication port suitable for transmitting and receiving data and instructions in the form of electrical signals, to and from remote computers;

a database manager for creating and revising records of said first database and said second database connected to said electronically readable memory responsive to a plurality of said remote computers;

an iterative database query engine connected to said memory, said engine configured to permit an initial search and at least one subsequent search where said subsequent search operates on the results of said first search and any previous search; and a process controller connected to said database manager, said iterative data base query engine and said communication port;

wherein said second database is a job database containing a plurality of job records, each containing a plurality of search key fields.

2. A system according to claim 1, further comprising an accounting system connected to said process controller.

3. A system according to claim 1, wherein said first database is a resume database and comprises a plurality of records containing information suitable for employment applications.

4. A system according to claim 1, wherein said iterative database query engine includes:

means for searching on a plurality of search key fields of a database for satisfaction of one or more conditions;

means for reporting all variables in said search key fields of records which satisfy said one or more of said conditions.

5. A system according to claim 4, wherein said search key fields include at least a geographical key and a discipline key.

6. A system according to claim 5, further comprising means to restrict entries in at least one of said search key fields to a predetermined set of entries.

7. A computer system according to claim 1, further comprising means for relating a record of said first database to a record of said second database.

8. A computer system according to claim 7, wherein said means for relating comprises means for storing an identification of a record in said second database in a relation field of a record of said first database.

9. A computer system according to claim 7, wherein said means for relating comprises means for storing an identification of a record in said first database in a relation field of a record in said second database.

10. A computer system according to claim 7, wherein said means for relating comprise means for creating an entry in a relation table stored in electronically readable memory, wherein said relation entry includes identification of a record in said first database and identification of a record in said second database.

* * * * *